(No Model.) 2 Sheets—Sheet 1.
H. E. CASSEL.
STAIRCASE FOR DWELLINGS.
No. 606,273. Patented June 28, 1898.
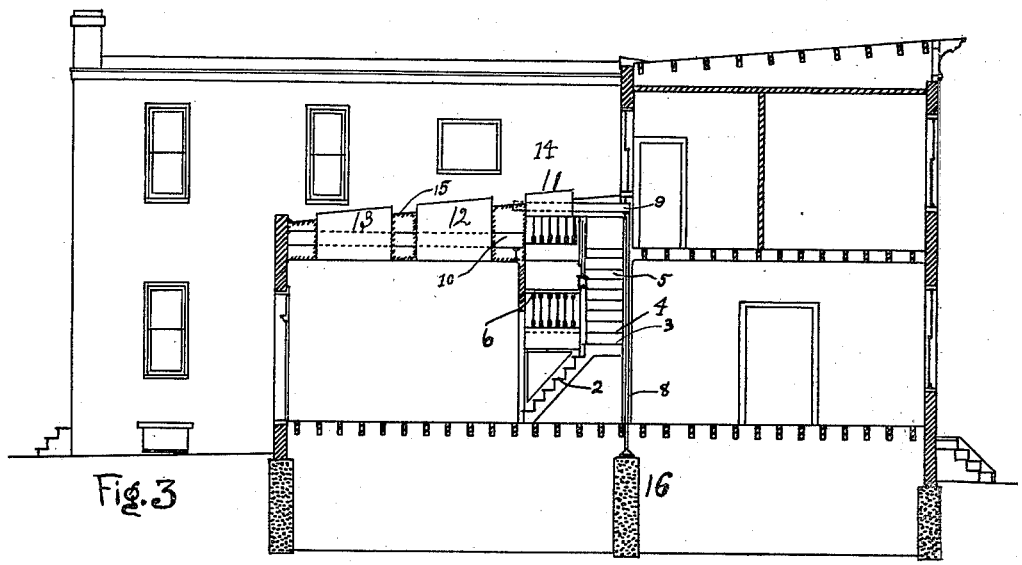
Fig. 3
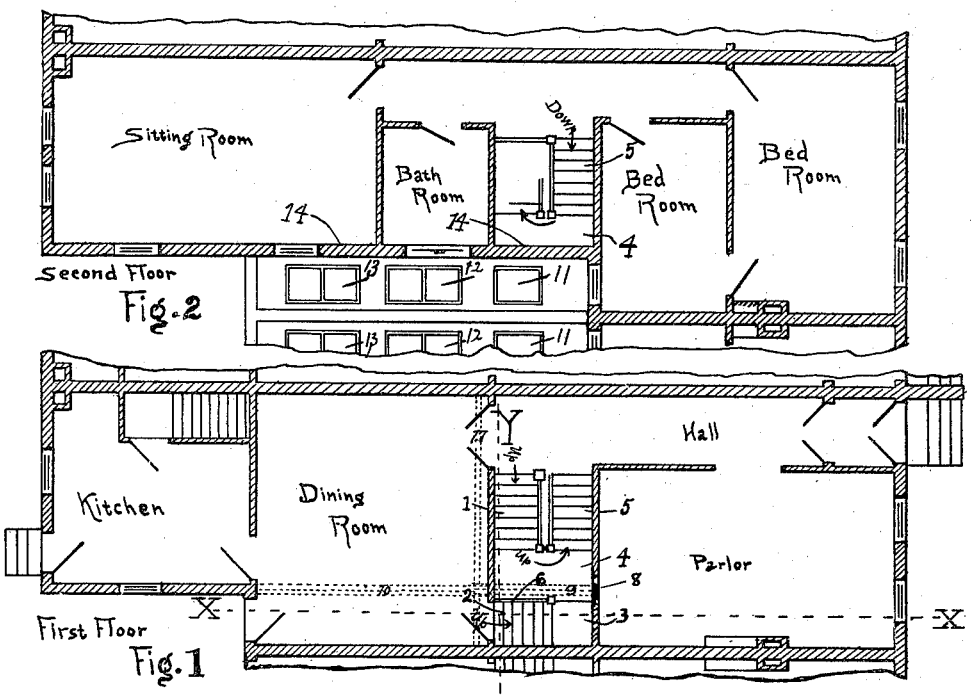
Fig. 2
Fig. 1
WITNESSES:
J. Schlegel.
N. Marcus Shinn.
INVENTOR
H. E. Cassel.
BY
John Shinn.
ATTORNEY.
THE NORRIS PETERS CO., PHOTO-LITHO., WASHINGTON, D. C.

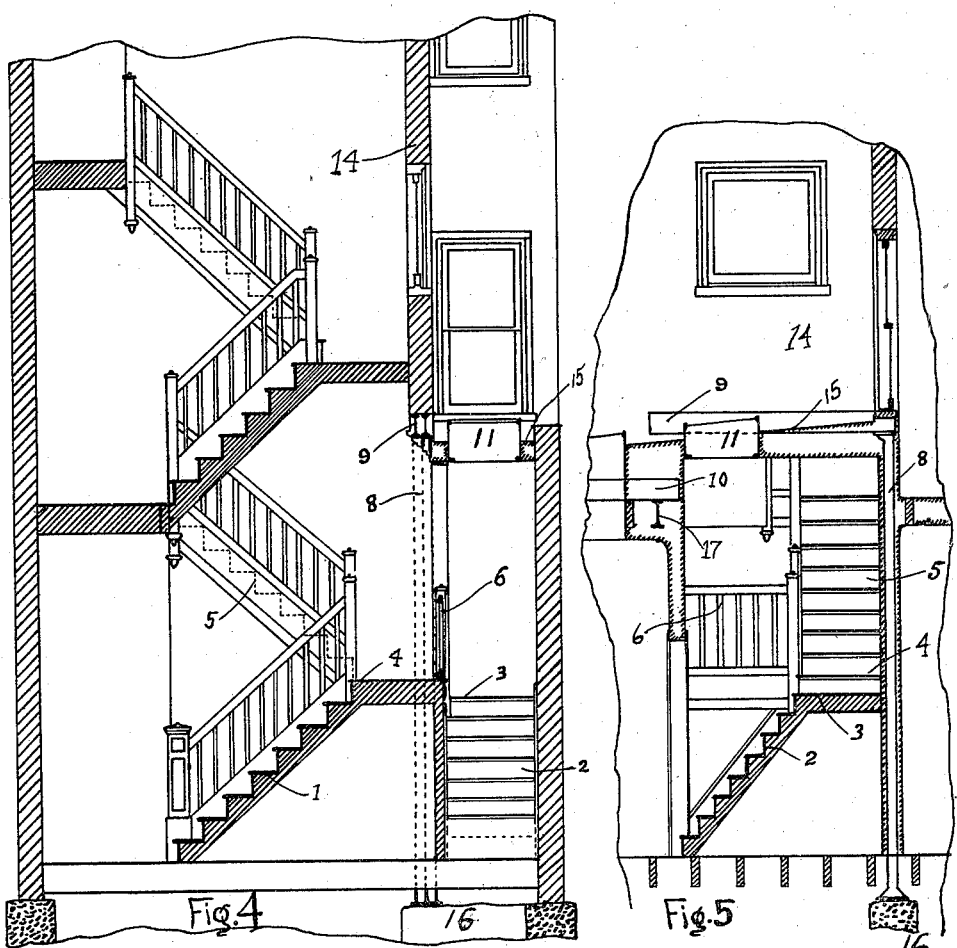

UNITED STATES PATENT OFFICE.

HARRY E. CASSEL, OF PHILADELPHIA, PENNSYLVANIA.

STAIRCASE FOR DWELLINGS.

SPECIFICATION forming part of Letters Patent No. 606,273, dated June 28, 1898.

Application filed January 22, 1898. Serial No. 667,664. (No model.)

*To all whom it may concern:*

Be it known that I, HARRY E. CASSEL, a citizen of the United States, and a resident of Philadelphia, in the county of Philadelphia and State of Pennsylvania, have invented certain new and useful Improvements in the Arrangement of Staircases for Dwellings, of which the following is a specification.

The object of my invention is to provide a front and back stairs combined, and especially adapted for a class of dwellings built in rows of two or more having a frontage of less than nineteen feet. I utilize a space for the back stairs that is usually used as an "area" or light-well hole, saving space and cost of two independent stairs.

The invention consists in constructing the main or front stairs at about a right angle to the main hallway to a "half-pace" platform or landing, thence to the second floor, combined with a back stairs built in a one-story structure and lighted by a skylight, the back stairs running parallel with and back of the midway platform of main stairs, as shown in the accompanying drawings, forming a part of this specification, in which—

Figure 1 is a floor plan of first story. Fig. 2 is a floor plan of second story. Fig. 3 is a vertical section of a two-story house, taken through dotted line X X of Fig. 1. Fig. 4 is a vertical section of a three-story house, taken through the dotted line Y Y of Fig. 1. Fig. 5 is a vertical section of the back stairs, showing the supporting-column, cross-girders, and skylight, taken on the dotted line X X of Fig. 1.

Same numerals of reference refer to same parts in all views.

The construction of my improvement is as follows:

It will be noticed, referring to Figs. 2 and 3, that a part of the dining-room and that portion of the first floor containing the back stairs are not under the main roof, but have a roof 15 of their own, one story high, which in no way interferes with any windows of the second floor. This roof contains openings for skylights 11, 12, and 13, (see Figs. 2 and 3,) giving light to dining-room, back stairs, and midway platform.

Referring to numerals of reference on the drawings, 1 denotes the main stairs from hall to half-pace platform 4; 2, the back stairs, leading from the dining-room to a "quarter-pace" platform 3, thence to half-pace platform 4 of main stairs, thereby forming a union of the two stairs.

5 represents the main stairs from half-pace platform to second floor; 6, the baluster-rail between half-pace platform of main stairs and the back stairs.

It will be seen that in the use of the back stairs 2 access may be had to the second floor without being seen from the front of the house or from the parlor should it be desired to have a door in the rear end of the parlor leading to the back hall under the "soffit" of stairs 5. This construction of stairs answers the same purpose of two independent stairs.

In order to construct and use a combination of two stairs, as above described, and not interfere with the arrangement of second or higher stories or their source of light, I have invented an arrangement whereby I get ample head room, so as to pass from one stairs to the other. This I accomplish by making the beams or girders 9 and 10, which supports the area-wall 14, Figs. 3, 4, and 5, overhanging the dining-room and stairs and are built in two sections 9 over the stairs on the same line but at a higher elevation than 10. On this girder 10 is built the second-story wall over the dining-room. The right-hand end of girder 9 I prefer to support in the following manner: Figs. 3, 4, and 5 show a column 8. The base of this column is resting on a foundation 16. This column is built in the partition-wall that divides the parlor from the stairs. The other end of girder 9 is supported on brickwork forming a part of the area-wall 14, built on the beam 10, overhanging the dining-room, as shown in Figs. 3, 4, and 5.

It is obvious that the skylight 11 may be dispensed with and light for stairs 2 received through a glass door at the foot of the stairs 2.

Having as above fully described the structure of my invention, what I claim as new, and desire to secure by Letters Patent, is—

In a dwelling, the structure described, consisting of, a lower story providing a hall and a room, and a second story, the said room extending in part under the second story and in part under and outside of a wall of the second story, a lower half-flight of stairway from the hall, a second lower half-flight from the room, the said half-flights meeting at a common midway platform, a single upper half-flight from said platform to the second floor and a built-up headway formed in the lower part of said second-story wall, to supply head room from said lower half-flight from room to said upper half-flight to second floor, as shown and described.

HARRY E. CASSEL.

Witnesses:
 JOHN SHINN,
 CLIFFORD P. ALLEN, Jr.